US009587746B2

(12) United States Patent
Bidkar et al.

(10) Patent No.: US 9,587,746 B2
(45) Date of Patent: *Mar. 7, 2017

(54) FILM RIDING SEALS FOR ROTARY MACHINES

(75) Inventors: Rahul Anil Bidkar, Niskayuna, NY (US); Neelesh Nandkumar Sarawate, Niskayuna, NY (US); Christopher Edward Wolfe, Niskayuna, NY (US); Eric John Ruggiero, Niskayuna, NY (US); Vivek Raja Raj Mohan, State College, PA (US)

(73) Assignee: General Electric Company, Niskayuna, NY (US)

( * ) Notice: Subject to any disclaimer, the term of this patent is extended or adjusted under 35 U.S.C. 154(b) by 786 days.

This patent is subject to a terminal disclaimer.

(21) Appl. No.: 13/562,705

(22) Filed: Jul. 31, 2012

(65) Prior Publication Data
US 2014/0062024 A1 Mar. 6, 2014

(51) Int. Cl.
*F16J 15/447* (2006.01)
*F01D 11/02* (2006.01)
(Continued)

(52) U.S. Cl.
CPC ......... *F16J 15/4476* (2013.01); *F01D 11/025* (2013.01); *F01D 11/04* (2013.01);
(Continued)

(58) Field of Classification Search
CPC ......... F01D 11/025; F01D 11/04; F01D 11/14
(Continued)

(56) References Cited

U.S. PATENT DOCUMENTS 3,051,497 A 8/1962 Wigg et al.
3,809,443 A 5/1974 Cherubim
(Continued)

FOREIGN PATENT DOCUMENTS

CN 102042045 A 5/2011
EP 1582700 A2 10/2005
(Continued)

OTHER PUBLICATIONS

International Search Report and Written Opinion issued in connection with corresponding PCT Application No. PCT/US2013/052524 dated Oct. 24, 2013.
(Continued)

*Primary Examiner* — Kristina Fulton
*Assistant Examiner* — Thomas Neubauer
(74) *Attorney, Agent, or Firm* — John P. Darling (57) ABSTRACT

A seal assembly for a rotary machine is provided. The seal assembly includes multiple sealing device segments disposed circumferentially intermediate to a stationary housing and a rotor. Each of the segments includes a shoe plate with a forward-shoe section and an aft-shoe section having one or more labyrinth teeth therebetween facing the rotor. The sealing device includes a stator interface element having a groove or slot for allowing disposal of a spline seal for preventing segment leakages. The sealing device segment also includes multiple bellow springs or flexures connected to the shoe plate and to the stator interface element. Further, the sealing device segments include a secondary seal integrated with the stator interface element at one end and positioned about the multiple bellow springs or flexures and the shoe plate at the other end.

20 Claims, 9 Drawing Sheets (51) Int. Cl.
*F01D 11/04* (2006.01)
*F16J 15/44* (2006.01)
*F01D 11/14* (2006.01)

(52) U.S. Cl.
CPC ........... *F16J 15/442* (2013.01); *F16J 15/445* (2013.01); *F01D 11/14* (2013.01)

(58) Field of Classification Search
USPC ................. 277/409, 411, 412, 413, 416, 421
See application file for complete search history.

(56) References Cited

U.S. PATENT DOCUMENTS

| | | | |
|---|---|---|---|
| 4,223,958 A | 9/1980 | Gray | |
| 5,100,158 A | 3/1992 | Gardner | |
| 5,370,402 A | 12/1994 | Gardner et al. | |
| 5,427,455 A | 6/1995 | Bosley | |
| 5,632,493 A | 5/1997 | Gardner | |
| 5,791,868 A | 8/1998 | Bosley et al. | |
| 5,833,369 A | 11/1998 | Heshmat | |
| 5,902,049 A | 5/1999 | Heshmat | |
| 5,915,841 A | 6/1999 | Weissert | |
| 6,371,488 B1 | 4/2002 | Szymborski et al. | |
| 6,505,837 B1 | 1/2003 | Heshma | |
| 6,527,274 B2 | 3/2003 | Herron et al. | |
| 6,547,257 B2* | 4/2003 | Cromer ................ | F16J 15/3288 277/355 |
| 6,648,332 B1* | 11/2003 | Burdgick ....................... | 277/303 |
| 6,655,696 B1* | 12/2003 | Fang et al. ..................... | 277/409 |
| 6,811,154 B2 | 11/2004 | Proctor et al. | |
| 6,854,736 B2 | 2/2005 | Paprotna | |
| 7,261,300 B2 | 8/2007 | Agrawal et al. | |
| 7,320,468 B2 | 1/2008 | Morgan | |
| 7,435,049 B2 | 10/2008 | Ghasripoor et al. | |
| 7,614,792 B2 | 11/2009 | Wade et al. | |
| 8,002,285 B2 | 8/2011 | Justak | |
| 8,303,245 B2 | 11/2012 | Foster et al. | |
| 8,919,781 B2* | 12/2014 | Justak ..................... | F16J 15/44 277/411 |
| 9,255,642 B2* | 2/2016 | Bidkar ................... | F16J 15/447 |
| 2005/0248100 A1 | 11/2005 | Gendraud et al. | |
| 2006/0067815 A1 | 3/2006 | Ghasripoor et al. | |
| 2006/0216146 A1 | 9/2006 | Thompson et al. | |
| 2007/0025837 A1 | 2/2007 | Pezzetti et al. | |
| 2007/0132193 A1 | 6/2007 | Wolfe et al. | |
| 2008/0309019 A1 | 12/2008 | Wolfe et al. | |
| 2010/0143101 A1 | 6/2010 | Fang et al. | |
| 2011/0121519 A1 | 5/2011 | Justak | |
| 2011/0304101 A1* | 12/2011 | Grondahl et al. ............ | 277/411 |
| 2012/0223483 A1* | 9/2012 | Bidkar et al. ................. | 277/301 |

FOREIGN PATENT DOCUMENTS

| | | |
|---|---|---|
| EP | 1835163 A1 | 9/2007 |
| EP | 2495398 A2 | 9/2012 |
| GB | 652109 A | 4/1951 |
| GB | 2450213 A | 12/2008 |
| JP | 62218889 A | 9/1987 |
| JP | 62243901 A | 10/1987 |
| JP | 2007521442 A | 8/2007 |
| WO | 2005031197 A1 | 4/2005 |

OTHER PUBLICATIONS

Munson et al., "Foil Face Seal Development", 37th AIAA/ASME/SAE/ASEE Joint Propulsion Conference, 2001, 11 Pages.

M. Salehi and H. Heshmat, "Performance of a Complaint Foil Seal in a Small Gas Turbine Engine Simulator Employing a Hybrid Foil/Ball Bearing Support System", Tribology Transactions, vol. 44, Issue 3, 2001, pp. 458-464.

Unofficial English Translation of Chinese Office Action issued in connection with corresponding CN Application No. 201380051276.6 on Sep. 6, 2015.

Unofficial English Translation of Japanese Office Action issued in connection with corresponding JP Application No. 2015-525487 on Mar. 1, 2016.

* cited by examiner

Axial direction →

FILM RIDING SEALS FOR ROTARY MACHINES

STATEMENT REGARDING FEDERALLY SPONSORED RESEARCH & DEVELOPMENT

This invention was made with partial Government support under contract number DE-FC26-05NT42643 awarded by U.S. Department of Energy. The Government has certain rights in the invention.

BACKGROUND

The present application relates generally to seal assemblies for turbo-machinery and more particularly relates to film riding seal assemblies for sealing rotor/stator gaps and the like.

Various types of turbo-machinery, such as gas turbine engines, aircraft engines and steam turbines, are known and widely used for power generation, propulsion, and the like. The efficiency of the turbo-machinery depends in part upon the clearances between the internal components and the leakage of primary and secondary fluids through these clearances. For example, large clearances may be intentionally allowed at certain rotor-stator interfaces to accommodate large, thermally or mechanically-induced, relative motions. Leakage of fluid through these gaps from regions of high pressure to regions of low pressure may result in poor efficiency for the turbo-machinery. Such leakage may impact efficiency in that the leaked fluids fail to perform useful work.

Different types of sealing systems are used to minimize the leakage of fluid flowing through turbo-machinery. The sealing systems, however, often are subject to relatively high temperatures, thermal gradients, and thermal and mechanical expansion and contraction during various operational stages that may increase or decrease the clearance therethrough. For example, traditional labyrinth seals that are assembled to run very tight clearance during start-up transient phase might run with large clearances during steady state operations, thereby leading to poor performance at steady state operation.

There is therefore a desire for improved compliant sealing assemblies for use with turbo-machinery for sealing rotor-stator gaps. Preferably such compliant sealing assemblies may provide tighter sealing during steady state operations while avoiding rubbing, wear caused by contact and damage during transient operations. Such sealing assemblies should improve overall system efficiency while being inexpensive to fabricate and providing an increased life for the associated parts.

BRIEF DESCRIPTION

In accordance with an embodiment of the invention, a seal assembly for a rotary machine is provided. The seal assembly includes multiple sealing device segments disposed circumferentially intermediate to a stationary housing and a rotor. Each of the segments includes a shoe plate with a forward-shoe section and an aft-shoe section having one or more labyrinth teeth therebetween facing the rotor, wherein the shoe plate is configured to allow a high pressure fluid to a front portion of the one or more labyrinth teeth and a low pressure fluid behind the one or more labyrinth teeth and further configured to generate an aerodynamic force between the shoe plate and the rotor The sealing device includes a stator interface element having a groove or slot for allowing disposal of a spline seal for reducing segment leakages. The sealing device segment also includes multiple bellow springs or flexures connected to the shoe plate and to the stator interface element, wherein the multiple bellow springs or flexures are configured to allow the high pressure fluid to occupy a forward cavity and the low pressure fluid to occupy an aft cavity. Further, the sealing device segments include a secondary seal integrated with the stator interface element at one end and positioned about the multiple bellow springs or flexures and the shoe plate at the other end.

In accordance with an embodiment of the invention, a method of manufacturing a seal assembly is provided. The method includes providing multiple sealing device segments for the seal assembly positioned intermediate to a stationary housing and a rotor. The method includes providing a shoe plate with a forward-shoe section and an aft-shoe section having one or more labyrinth teeth therebetween facing the rotor, wherein the shoe plate is configured to allow a high pressure fluid to a front portion of the one or more labyrinth teeth and a low pressure fluid behind the one or more labyrinth teeth and further configured to generate an aerodynamic force between the shoe plate and the rotor The method also includes connecting multiple bellow springs or flexures to the shoe plate and to a stator interface element, wherein the multiple bellow springs or flexures are configured to allow the high pressure fluid to occupy a forward cavity and the low pressure fluid to occupy an aft cavity. Further, the method includes disposing a spline seal within a groove or slot in the stator interface element for reducing segment leakages. The method includes integrating one end of a secondary seal with the stator interface element; and positioning the other end of the secondary seal about the plurality of bellow springs and the shoe plate.

In accordance with an embodiment of the invention, a rotary machine is provided. The rotary machine includes a rotor, a stator housing and multiple sealing device segments disposed circumferentially intermediate to the stationary housing and the rotor, wherein each of the segments comprises a shoe plate with a forward-shoe section and an aft-shoe section having one or more labyrinth teeth therebetween facing the rotor, wherein the shoe plate is configured to allow a high pressure fluid to a front portion of the one or more labyrinth teeth and a low pressure fluid behind the one or more labyrinth teeth and further configured to generate an aerodynamic force between the shoe plate and the rotor. Each of the segments also includes a stator interface element that includes a groove or slot for allowing disposal of a spline seal for reducing segment leakages. The sealing device segment further includes multiple bellow springs or flexures connected to the shoe plate and to the stator interface element; wherein the multiple bellow springs or flexures are configured to allow the high pressure fluid to occupy a forward cavity and the low pressure fluid to occupy an aft cavity and a secondary seal integrated with the stator interface element at one end and positioned about the multiple bellow springs and the shoe plate at the other end.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
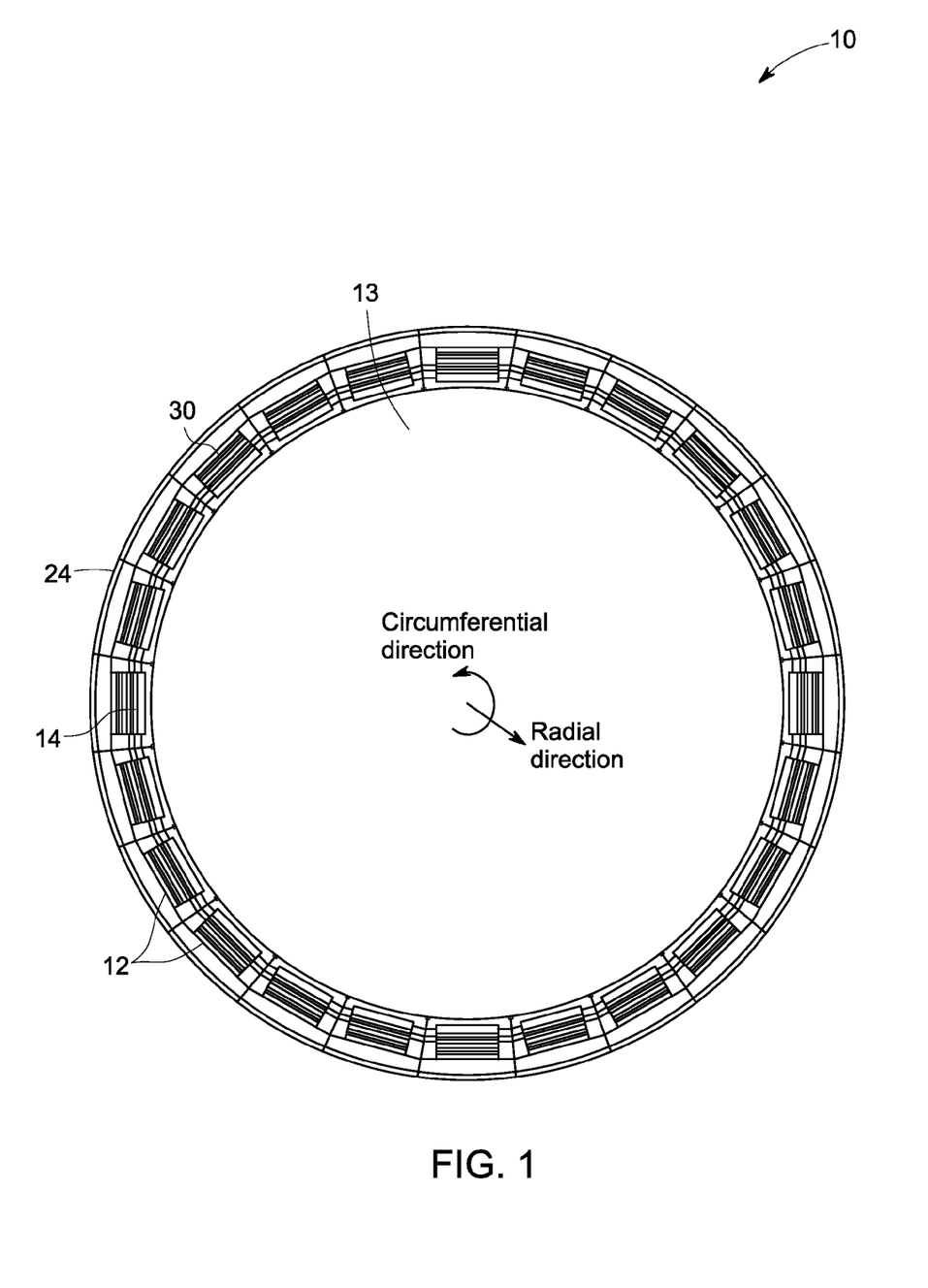
FIG. 1 is a cross-section view of a rotor showing a film riding seal assembly of a rotary machine in accordance with an embodiment of the present invention.

FIG. 1 is a cross-section view of a film riding seal assembly 10 for a rotary machine in accordance with an embodiment of the present invention. The seal assembly 10 is circumferentially arranged around a rotor shaft 13 such that the seal assembly 10 is intermediate to a stationary housing and the rotor shaft 13. The stationary housing may include stator interface elements 24 that form the radially outwards region of the seal assembly 10. The seal assembly 10 includes multiple sealing device segments 12 located adjacent to each other to form the seal assembly 10. Each of the sealing device segment 12 includes a shoe plate 14 located proximate to the rotor shaft 13. During operation of the rotary machine, the shoe plate 14 rides on a fluid film above the rotor shaft 13. The seal assembly 10 also includes one or more labyrinth teeth (shown as 16 in FIG. 2) located on the shoe plate 14 at a side facing the rotor shaft surface. The labyrinth teeth substantially separate fluids from a high pressure region 18 (shown in FIG. 2) from a low pressure region 20 (shown in FIG. 2) on either sides of the seal assembly 10 of the rotary machine. The seal assembly 10 also includes multiple bellow springs 30, 32 (shown in FIG. 2) or flexures 31, 33 (shown in FIG. 3) attached to the shoe plate 14 and an interface element 24. In this view, only forward bellow springs 30 are shown located in each of the sealing device segments 12. Each of the sealing device segments 12 are assembled relative to the rotor such that there is a clearance gap between each shoe plate 14 and the rotor shaft 13. The adjacent sealing device segments 12 also include a clearance gap between them.

Figure 2:
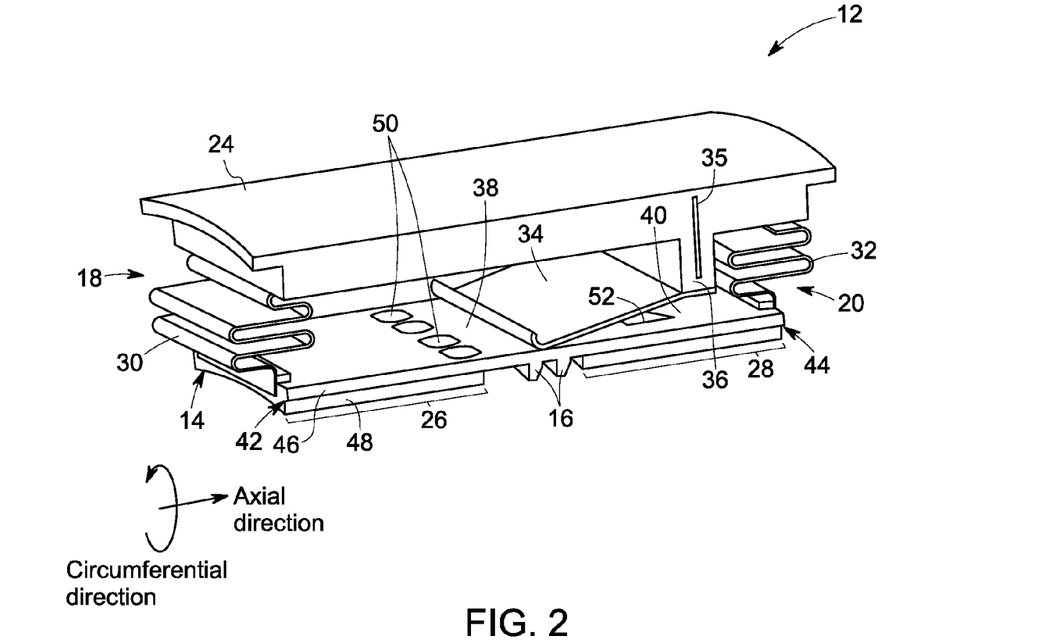
FIG. 2 is a perspective view of a sealing device segment in accordance with an embodiment of the present invention.

FIG. 2 is a perspective view of the sealing device segment 12 in accordance with an embodiment of the present invention. As shown, the sealing device segment 12 includes the shoe plate 14 with a forward shoe section 26 and an aft-shoe section 28 having one or more labyrinth teeth 16 therebetween facing the rotor shaft (shown as 13 in FIG. 1). The sealing device segment 12 includes one or more bellow springs that comprises of a forward bellow spring 30 and an aft bellow spring 32. The sealing device segment 12 further includes a secondary seal 34 attached to a stator top interface element 24 via a cantilever beam section 36 at one end and positioned about the plurality of bellow springs 30, 32 and the shoe plate 14 at the other end. Each of the secondary seal 34 forms a line contact with the shoe plate 14 at the one second end. In this embodiment, the stator interface element 24 includes a groove or slot 35 for allowing disposal of a spline seal for reducing leakages between stator interface elements of adjacent sealing device segments 12. Further, as shown in this embodiment, the bellow springs 30, 32 and the secondary seal 34 are straight in the circumferential direction. The straight bellows springs 30, 32 and the straight secondary seal 34 allow the mechanical stresses to remain low. In another embodiment, the bellow springs 30, 32 and the secondary seal 34 may be curved in the circumferential direction.

In the seal assembly 10 (as shown in FIG. 1), the secondary seals 12 from neighboring sealing device segments 12 form a resistance path for the flow of fluid between the top interface element 24 and the shoe plate 14. In one embodiment, the forward bellow spring 30 and the aft bellow spring 32 are located symmetrically on either side of the line of contact between the secondary seal 34 and the shoe plate 14. This symmetric arrangement allows the shoe plate 14 to translate radially with minimum tilt (edge of the forward shoe section 26 closer to the rotor than the edge of the aft shoe section 28 or vice versa). The reduced tilt caused by the symmetric design also ensures that the shoe plate 14 can travel large displacements both radially inwards and radially outwards (during rotor growth events) in a robust manner.

There exists a small leakage past the line of contact between the secondary seal 34 and the shoe plate 14. The secondary seal 34 is configured to partition the sealing device segment 12 into a forward cavity 38 towards the high pressure side 18 and an aft cavity 40 towards the low pressure side 20 of the rotary machine.

Figure 3:
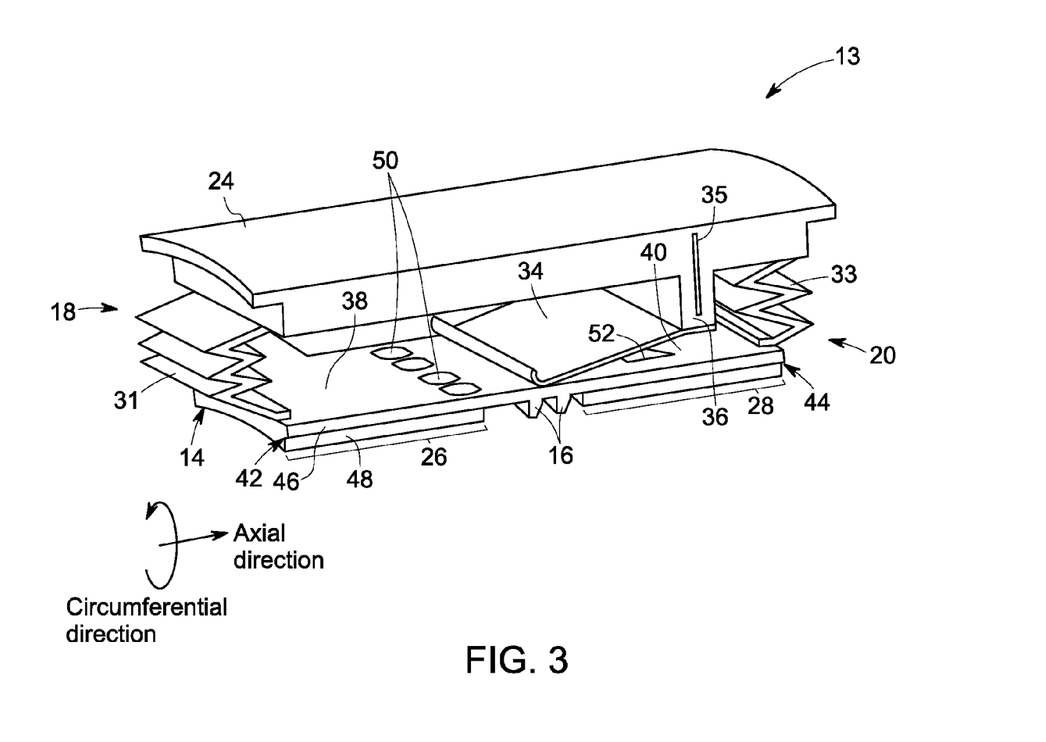
FIG. 3 is a perspective view of a sealing device segment with flexures in accordance with another embodiment of the present invention.

In one embodiment as shown in FIG. 3 a sealing device segment 13 includes multiple flexures 31, 33 connected to the shoe plate 14 and the top interface element 24. The one or more flexures may either be W-shaped or V-shaped. Other features of the sealing device segment 13 are similar to the sealing device segment 12. Each of the multiple flexures 31, 33 of FIG. 3 or the bellow springs 30, 32 of FIG. 2 comprise of a circumferential width less than each of the circumferential widths of the top interface element 24 and the shoe plate 14. This ensures that upon pressurization of the rotary machine, the fluid flows around the forward bellow spring 30 or the flexure 31 and pressurizes the forward cavity 38. Similarly, at the low pressure side 20 of the rotary machine, the low pressure fluid flows around the aft bellow spring 32 or the flexure 33 to create a low pressure behind the secondary seal 34 within the aft cavity 40.

Further, in one embodiment of FIG. 2 or FIG. 3, the sealing device segment 12 includes a forward shoe feeding groove 42 and an aft shoe feeding groove 44 at sides of the shoe plate 14 towards a high pressure side 18 and a low pressure side 20 of the rotary machine respectively. A top portion 46 of the shoe plate 14 includes a circumferential width that is wider than a bottom portion 48 forming the feeding grooves 42, 44. The forward shoe feeding grooves 42 allow high pressure fluid to flow into the forward cavity 38 located upstream of the labyrinth teeth 16. Similarly, the aft shoe feeding groves 44 allow low pressure air to flow to the aft cavity 40 located downstream of the labyrinth teeth 16. As shown in FIG. 2 and FIG. 3, the shoe plate 14 also includes multiple forward ports 50 located upstream of the line contact at the high pressure side 18 of the rotary machine for allowing an axial flow of a fluid to a front portion of the one or more labyrinth teeth 16. Further, the shoe plate 14 also includes one or more aft ports 52 located downstream of the line contact at a low pressure side 20 of the rotary machine. In one embodiment, the one or more aft ports 52 are angled in a circumferential direction to impart a tangential flow to a fluid flowing from behind the single or multiple labyrinth teeth 16 into the aft cavity 40. In another embodiment, the one or more aft ports 52 are straight ports or circumferential angled ports for allowing the flow of fluid from behind the labyrinth teeth 16 to the aft cavity 40 of the sealing device segment 12.

Figure 4:
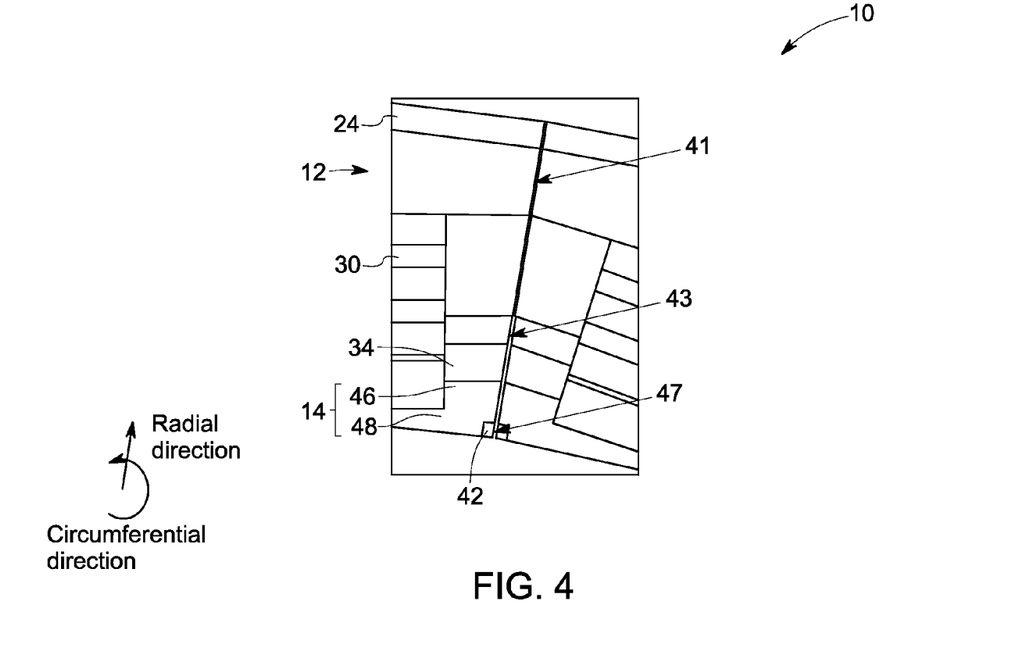
FIG. 4 is a portion of a front view of a film riding seal assembly in accordance with an embodiment of the present invention.

Between adjacent sealing device segments 12 in the seal assembly 10 (as shown in FIG. 1), there exists a clearance gap between the adjacent secondary seals 36. FIG. 4 is a portion of the seal assembly 10 (as shown in FIG. 1) that shows radial gaps between adjacent sealing device segments 12 (as shown in FIG. 1). As shown, the stator top interface elements 24 form a part of the stator housing and has a stator-stator radial gap 41 between adjacent sealing device segments 12. The presence of spline seals in the spline slots 35 (as shown in FIG. 2, FIG. 3) provides leakage resistance between the high pressure fluid in the forward cavity 38 and the low pressure fluid in the aft cavity 40 for leakage paths that might be created due to a variable stator-stator radial gaps between neighboring sealing device segments. In a non-limiting example, the spline seals are about 0.003 inches to about 0.015 inches thick and made from a high temperature metal alloy. The adjacent secondary seals 34 also reveal a radial secondary seal segment gap 43. There also exist radial segment gaps 47 between neighboring shoes plates 14. In the seal assembly 10, the radial gaps 41, 43, 47 between neighboring shoe plates 14 and neighboring secondary seals 34 are configured such that any radial motion of the sealing device segments 12 towards the rotor or any circumferential thermal expansion of the sealing device segments 12 does not cause segment binding.

Figure 5:
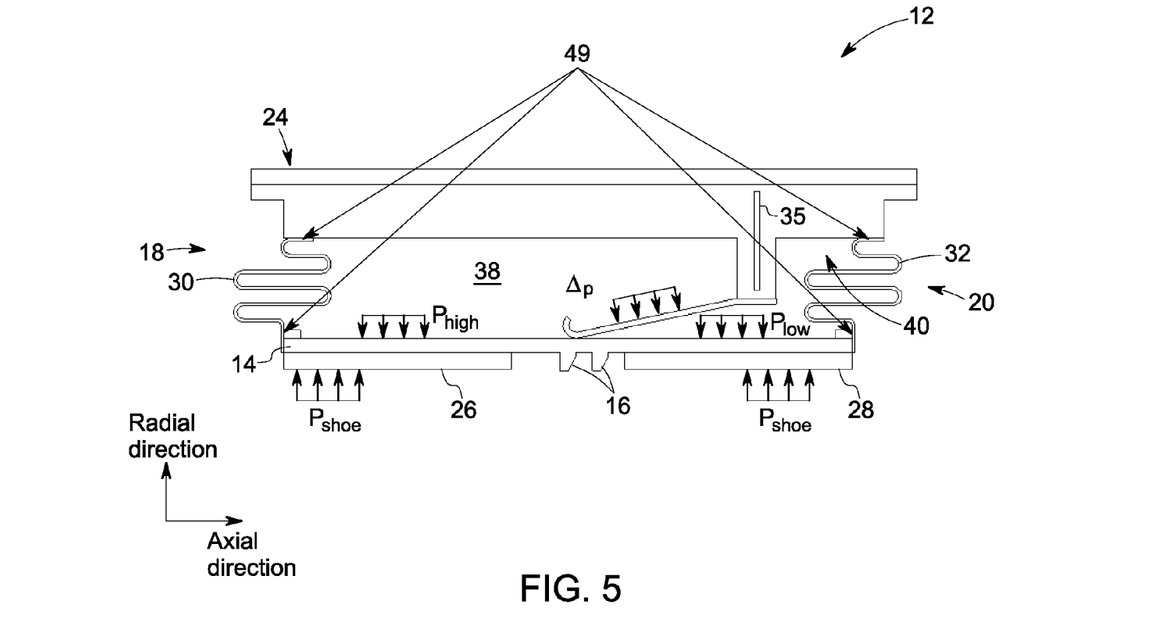
FIG. 5 is a side view of a sealing device segment in accordance with an embodiment of the present invention.

FIG. 5 is a side view of the sealing device segment 12 in accordance with an embodiment of the present invention. As shown in one embodiment, the forward bellow spring 30 and aft bellow spring 32 are connected to the top interface element 24 and the shoe plate 14 by braze joints 49. FIG. 5 also shows various pressure forces acting on the shoe plate 14 and the secondary seal 34. In the forward cavity 38 and the aft cavity 40, the pressurization of the sealing device segment 12 causes the shoe plate 14 to move towards the rotor during start-up operation of the rotary machine. In a non-limiting example, the shoe plate 14 may ride on a fluid film in an aerostatic mode of operation, which fluid film thickness may range from about 3/1000 inches to 5/1000 inches depending on an initial seal assembly clearance with the rotor.

In the aerostatic operation mode, the pressurization causes the secondary seal 34 to deflect radially inwards pushing the shoe plate 14 towards the rotor 13 (as shown in FIG. 1). While the secondary seal 34 pushes the shoe plate 14 towards the rotor, the bellows springs 30, 32 support and guide the motion of the shoe plate 14. Apart from secondary seal contact force and bellow spring forces, the shoe plate 14 is also subjected to aerostatic pressure loads. These aerostatic pressure loads are caused by the presence of fluid around the shoe plate 14. As shown in the radially outer face of FIG. 5, the shoe plate 14 is subjected to high pressure ($P_{high}$) and low pressure fluid ($P_{low}$) on either side of the secondary seal line contact between the secondary seal 34 and the shoe plate 14.

In one embodiment, the forward ports 50 and the two forward shoe feeding grooves 42 (as shown in FIG. 2, FIG. 3) bring the high pressure fluid from the forward cavity 38 to a front side of the single or multiple labyrinth teeth 16. Similarly, the one or more aft ports 52 and the aft shoe feeding grooves 44 (as show in FIG. 2, FIG. 3) bring a low pressure fluid from the aft cavity 40 to a back side of the single or multiple labyrinth teeth 16. Thus, the single or multiple labyrinth teeth 16 are subjected to the pressure drop across the sealing device segment 12 and perform the function of providing the flow restriction for leakage along the rotor-shoe plate gap. Due to the presence of the forward ports 50, all faces of the shoe plate 14 upstream of the secondary seal 34 are subjected to a high pressure fluid. Similarly, the one or more aft ports 52 ensure that all faces of the shoe plate 14 downstream of the secondary seal 34 are subjected to low pressure fluid. When the fluid film thickness is 3/1000 to 5/1000 inches or larger between the shoe plate 14 and the rotor surface, the rotation of the rotor does not cause the fluid film pressure beneath the shoe plate 14 to be significantly different from the high and low pressures caused by the forward ports 50 and the aft ports 52. As a consequence, the net fluid load on the shoe plate 14 is approximately zero. The shoe plate 14 moves radially inwards under the influence of an almost zero net fluid load since a secondary seal force Δp pushes the shoe plate 14 inwards, and the bellow springs supporting the shoe plate act against this radially inwards motion.

Figure 6:
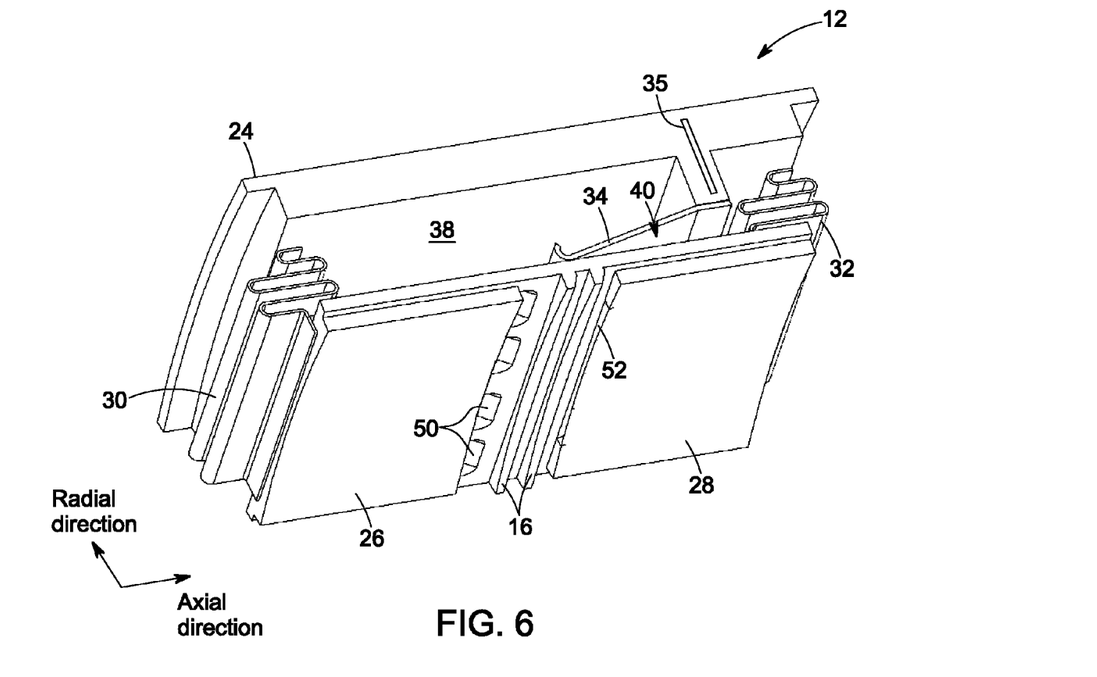
FIG. 6 is a bottom view of a sealing device segment in accordance with an embodiment of the present invention.
Figure 7:
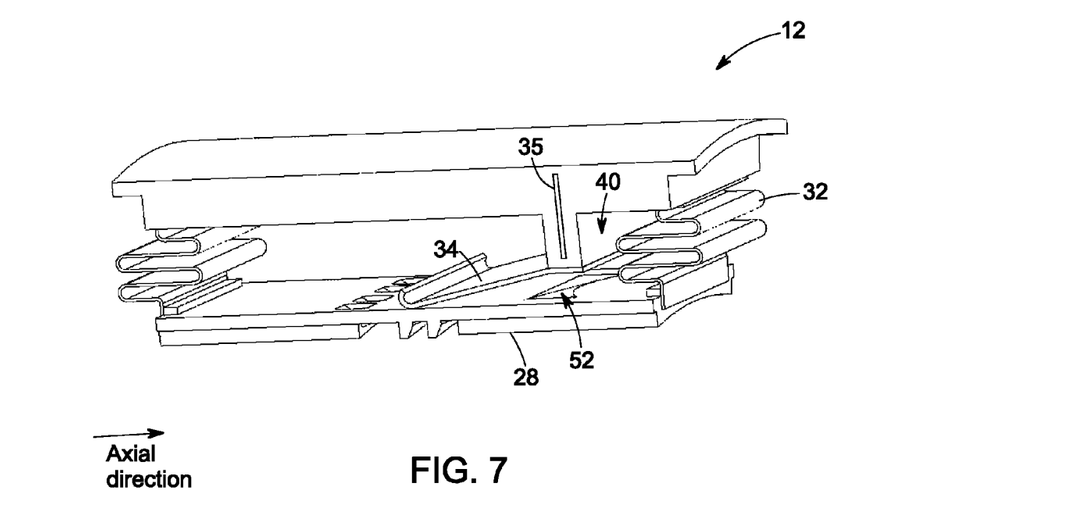
FIG. 7 is a perspective view of a sealing device segment in accordance with another embodiment of the present invention.

FIG. 6 is a bottom view of a sealing device segment 12 in accordance with an embodiment of the present invention. In this embodiment, the sealing device segments 12 show the forward ports 50 that includes four ports. In other embodiments, the forward ports 50 may be fewer ports or more than four ports. In the current embodiment, the forward ports 50 are configured to allow the fluid to flow from the forward ports 50 to the front of the single or multiple labyrinth teeth 16 in an axial direction. In another embodiment, the forward ports 50 are angled in a circumferential direction to impart the fluid to swirl (gain tangential velocity) as the fluid flows from a forward cavity 38 to a front portion of the single or multiple labyrinth teeth 16. In this embodiment, one first end of the aft port 52 is shown from a bottom view of the sealing device segment 12. The aft port 52 connects the backside of the labyrinth teeth 16 to the aft cavity 40. As shown, one opening of the aft port 52 is located at a first edge of the aft shoe section 28 facing the backside of the labyrinth teeth 16. A second opening of the aft port 52 in the aft cavity 40 is shown in FIG. 7. In one embodiment, the aft port 52 may be split into more ports. In a further embodiment, the one or more aft ports 52 are angled in a circumferential direction to impart a tangential flow to a fluid flowing from behind the single or multiple labyrinth teeth 16 into the aft cavity 40.

Figure 8:
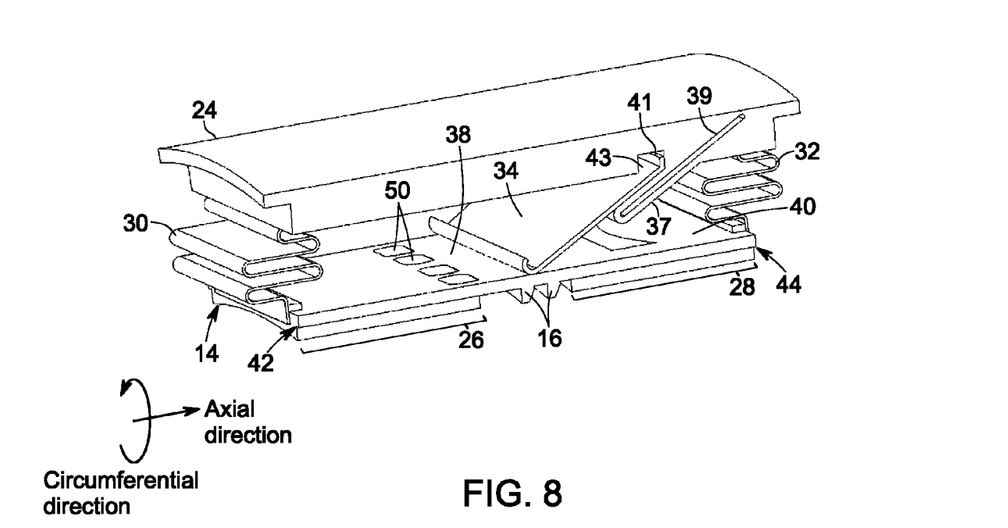
FIG. 8 is a perspective view of a sealing device segment with a supporting structure element integrated with a secondary seal in accordance with another embodiment of the present invention.

FIG. 8 is a perspective view of a sealing device segment 15 having a supporting structure element 37 integrated with the secondary seal 34 in accordance with another embodiment of the present invention. In this embodiment, one end of the secondary seal 34 includes an angled end 41 attached in a slot 43 located in the stator top interface element 24. The supporting structure element 37 is an extension of the stator top interface element 24. The supporting structure element 37 is interfaced with the secondary seal 34 such that radially outward motion of the secondary seal 34 is possible with relatively small resistance while any radially inward motion of the secondary seal 34 is reduced as described later. The supporting structure element 37 may include a groove or slot 39 for allowing disposal of a spline seal shim for restricting leakages at stator-stator gaps between high pressure fluids in the forward cavity 38 and low pressure fluids at the aft cavity 40. Other features of the sealing device segment 15 are similar to features of sealing device segments 12, 13 (as shown in FIG. 2, FIG. 3). The use of spline seal shim within the groove or slot 39 is intended for reducing leakage between the stator-stator gaps of neighboring segments as well as for reducing the leakage between secondary seals of neighboring segments. The groove or slots 39 and the thickness of the spline seal shims are configured to withstand radial and axial mismatch caused between neighboring stator interface elements 24 due to assembly variations or thermal and pressure deflections of neighboring stator interface elements 24.

The supporting structure element 37 interfaced with the secondary seal 34 imparts nonlinear spring stiffness characteristics to the secondary seal 34. In one embodiment, the secondary seal 34 imparts bi-linear spring stiffness characteristics to the secondary seal 34. For radially inwards motion, the secondary seal behavior is similar to a short stiff cantilever beam with one end attached to the supporting structure element 37 and the other end free to slide axially along the shoe plate 14. The stiff spring characteristics of the secondary seal 34 are desirable for radially inwards motion to limit the extent of radially inwards shoe motion and also to limit the mechanical stresses in the secondary seal 34 caused due to pressurization and radially inwards motion. Conversely, during rotor growth events (i.e. when the shoe moves radially outwards), the resistance offered by a short stiff secondary seal 34 is undesirable. However, since the secondary seal 34 is not attached to the supporting structure element 37, the secondary seal 34 can easily lift-off/peel-off from the supporting structure element 37. In the case of radially outward motion, the secondary seal behavior is like a soft long cantilever with reduced resistance for outward shoe motion.

Figure 9:
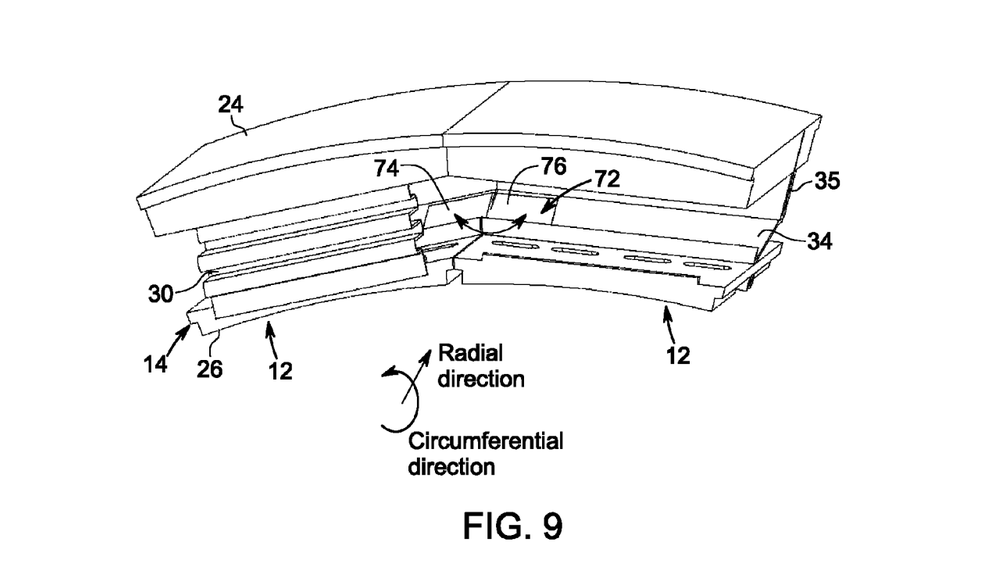
FIG. 9 is a film riding seal assembly with shiplap shims between adjacent sealing device segments in accordance with an embodiment of the present invention.

FIG. 9 is a film riding seal assembly 70 with multiple shiplap shims 72 between adjacent sealing device segments 12 in accordance with an embodiment of the present invention. The multiple shiplap shims 72 are disposed so as to overlap adjacent secondary seals 34 in the seal assembly 70. Each of the shiplap shims 72 includes a first shim 74 and a second shim 76 angularly attached to each other. In one embodiment, each of the shiplap shims 72 is a bent metal shim attached (brazed) to the secondary seal of one segment such that it extends on to the secondary seal of the neighboring segment. The included angle of the bent shims 74, 76 is configured to conform to the angle formed between straight lines along two neighboring secondary seals 34. For each of the shiplap shims 72, the first shim 74 is attached to one of the secondary seal 24 and the second shim 76 is an extending shim configured to freely slide on the adjacent secondary seal of the seal assembly 70. Such an extending shim is expected to close under pressurization and reduce the segment gap leakage between the neighboring secondary seals 34.

The seal assembly 70 is assembled relative to the rotor 13 (as shown in FIG. 1) such that there is a clearance gap between each shoe plate 14 and the rotor 13 and between each neighboring shoe plate 14. The secondary seals 34 of neighboring segments 12 also have clearance gaps between them (except when covered by shiplap shim 72 as shown in FIG. 9) to avoid segment binding. Upon pressurization, the fluid flows around the forward bellow springs 30 (which are shorter in width than the seal segments 14, 24) and pressurizes the forward cavity 38 (shown in FIG. 1). The secondary seals 34 from neighboring segments 12 along with the spline seals and/or shiplap shims 70 form a resistance path for the fluid flow between the stator interface elements 24 and the shoe plates 14. Since each secondary seal 34 forms a line contact with the respective shoe plate, there exists relatively small leakage past this line contact between the shoe and the secondary seal, and a small leakage across an arrangement of the spline seals and shiplap shims 70. Low pressure fluid flows around the aft bellow 32 (shown in FIG. 2) to create low pressure behind the secondary seal 34, splines and/or shiplap shims 70 arrangement. Thus the pressure drop across the seal assembly 70 happens across the arrangement of the secondary seal 34, the splines and/or the shiplap shims 70. The pressurization of the seal causes the shoe plate 14 to move towards the rotor, and depending on its initial assembly clearance, the shoe plate of each segment 12 rides on a fluid film ($3/1000$ to $5/1000$ inches thick), thereby operating in an aerostatic mode.

Figure 10:
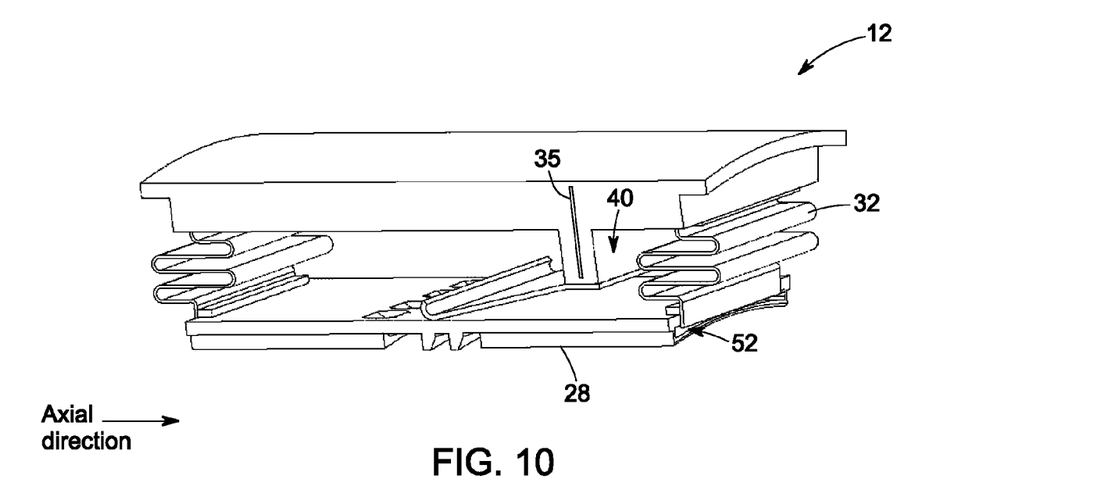
FIG. 10 shows an aft port in a sealing device segment in accordance with an embodiment of the present invention.

FIG. 10 shows another aft port 52 in a sealing device segment 12 in accordance with an embodiment of the present invention. In this embodiment, the one or more aft ports 52 are straight ports or circumferential angled ports for allowing a flow of fluid from behind the multiple labyrinth teeth 16 directly to a downstream cavity of the sealing device segment 12. The first end opening of the one or more aft ports 52 may be located at the first edge of the aft shoe section 28 facing the backside of the labyrinth teeth 16. As shown in this embodiment, the second end opening of the one or more aft ports 52 may be located at a second edge of the aft shoe section of the shoe plate 14 directing the flow of fluid from behind the multiple labyrinth teeth 16 directly to a downstream cavity of the sealing device segment 12.

Figure 11:
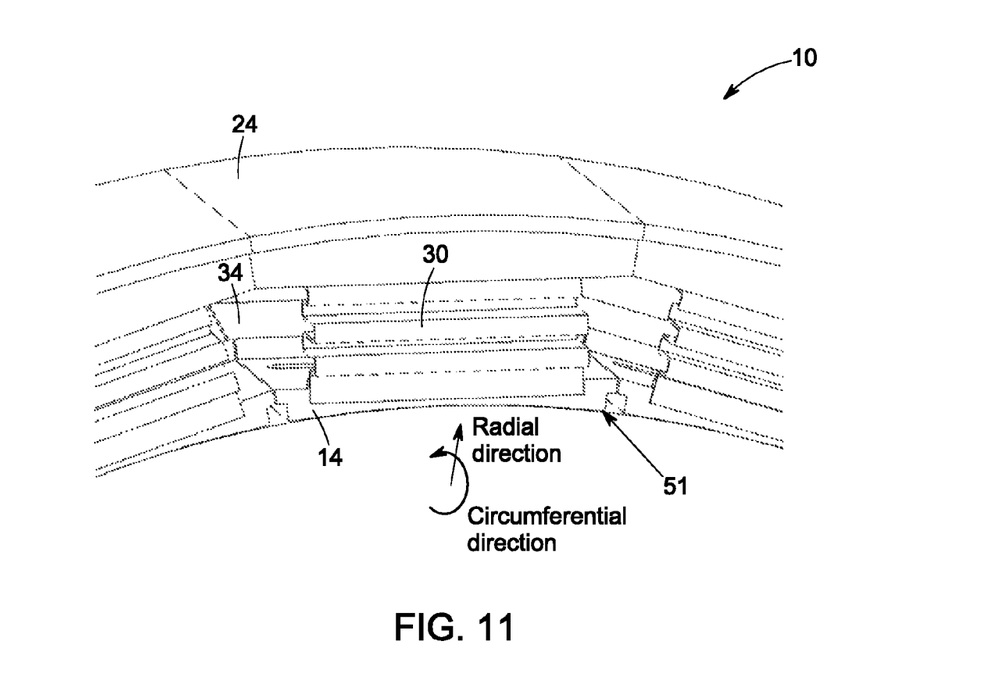
FIG. 11 shows shoe-rotor curvature in an aerodynamic seal assembly in accordance with an embodiment of the present invention.

FIG. 11 shows shoe-rotor curvature in the seal assembly 10 in accordance with an embodiment of the present invention. The seal assembly 10 also operates in an aerodynamic mode of operation. When the rotor-shoe plate gap starts reducing (e.g. during a thermal transient event causing clearance change), a thin fluid film 51 starts building additional pressure. In this embodiment, the radius of curvature of the shoe plate 14 is intentionally machined to be larger than the rotor radius. As a consequence, when the rotor-shoe plate gap becomes small (typically less than $1/1000$ inch), the fluid film 51 is either monotonically converging or converging-diverging in the direction of rotation. This fluid film in a form of fluid wedge causes additional pressure to build-up. The physics of thin film is well understood from hydrodynamic journal bearings or foil bearings, and can be modeled using appropriate fluid flow models. The basic principle is that any negative gradient in the fluid film thickness in the direction of rotation will increase the pressure in the fluid film above its boundary pressure. The additional pressure caused by the thin fluid film squeezes the bellow springs 30, 32, thereby, moving the shoe plate 14 radially outwards and keeping the rotor from contacting the shoe plate 14. In this sense, any outward excursion of the rotor is tracked by the shoe plate 14 on every sealing device segment 12.

Figure 12:
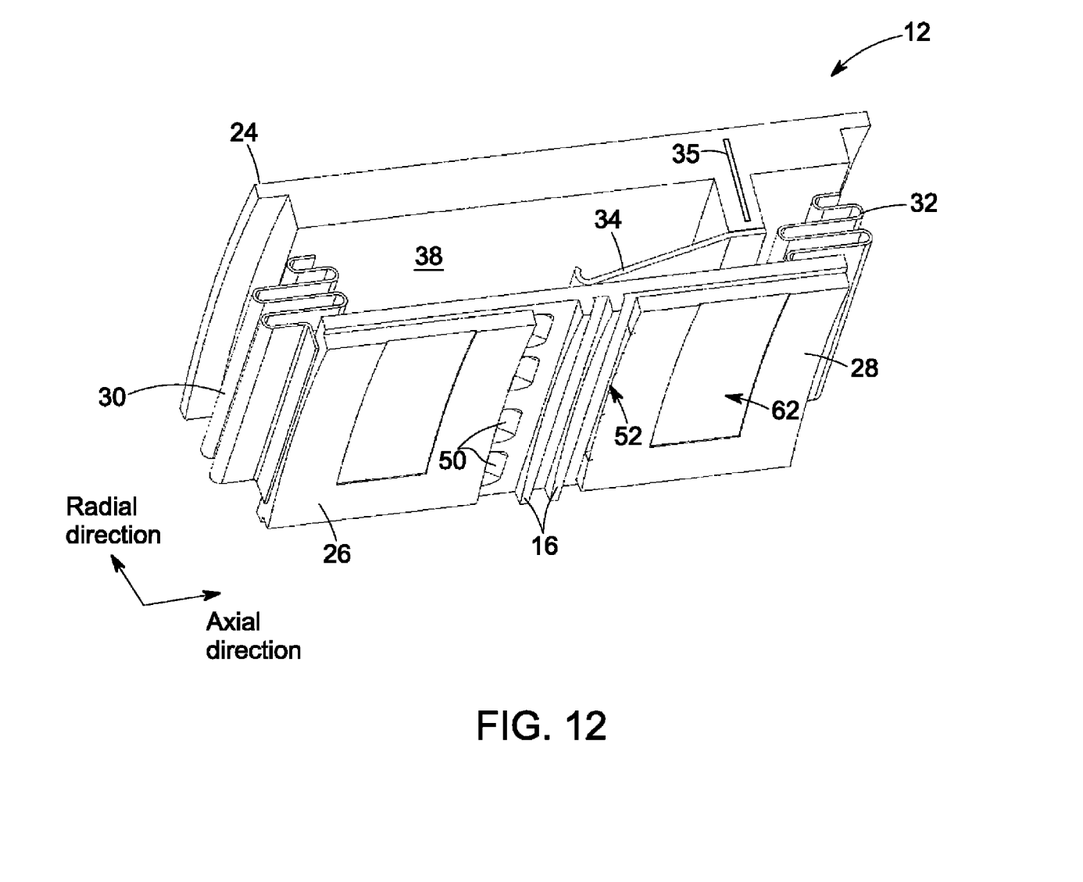
FIG. 12 shows Rayleigh steps in a sealing device segment in accordance with an embodiment of the present invention.

In another embodiment as shown in FIG. 12, the thin fluid film generates additional force due to the presence of one or more Rayleigh steps 60, 62 on the shoe plate 14 in the direction of rotation. As shown, the forward shoe section 26 includes a first Rayleigh step 60 and the aft shoe section 28 includes a second Rayleigh step 62. It should be noted that the multiple forward ports 50 and one or more aft ports 52 also serve the purpose as cooling ports for carrying away the additional heat that might be generated in the thin film aerodynamic mode of seal operation.

The presence of two shoes sections, i.e. forward shoe section 26 and the aft shoe section 28 allows the generation of aerodynamic moments (about the circumferential axis) in both directions. For example, if the shoe plate 14 is tilted such that an aft edge of the aft shoe section 28 is closer to the rotor than the forward edge of the forward shoe section 26, then the aft shoe section 28 will generate more aerodynamic force than the forward shoe section 26 and the resulting aerodynamic moment will correct the tilt of the shoe. Similarly, the forward shoe section 26 allows for aerodynamic tilt correction in the event that the forward shoe section 26 is closer to the rotor. Overall, a two shoe plate section arrangement with curvature mismatch with the rotor or one or more Rayleigh steps 60, 62 allows for self-correcting seal behavior that can correct not only radial clearance changes but also forward-aft tilts in the seal.

In a non-limiting example, both the bellows springs 30, 32 and the secondary seal 34 (as shown in FIG. 2) are formed from high temperature metal alloy shims like Inconel X750 or Rene41. Both ends of the bellow springs 30, 32 are brazed to the top interface element 24 and the shoe plate 14. The secondary seal 34 is cantilevered (brazed) to the stator or top interface element 24 and free to slide axially on the shoe plate surface. In the present embodiment, the free end of the secondary seal 34 touches the shoe plate 14 (as shown) and remains in contact with the shoe plate 14 at all times. In one embodiment, there may be a gap (no-contact) between the secondary seal 34 and the shoe plate 14 before pressurization, and this gap will close upon pressurization to establish a contact between the secondary seal 34 and the shoe plate 14. In one embodiment, the shoe plate 14 and the stator interface piece or the top interface element 24 are machined or cast. In one embodiment, the radially innermost surface of the shoe plate may be coated with lubricating coatings like NASA PS304 or NASA PS400 a similar coating that can handle unintentional rubs between the shoe plate 14 and the rotor. In another embodiment, the rotor surface interfacing with the shoe plate 14 may be coated with Chromium carbide or Titanium aluminum Nitride or similar coatings to improve the rotor's hardness, corrosion resistance and ability to maintain good surface finish.

Figure 13:
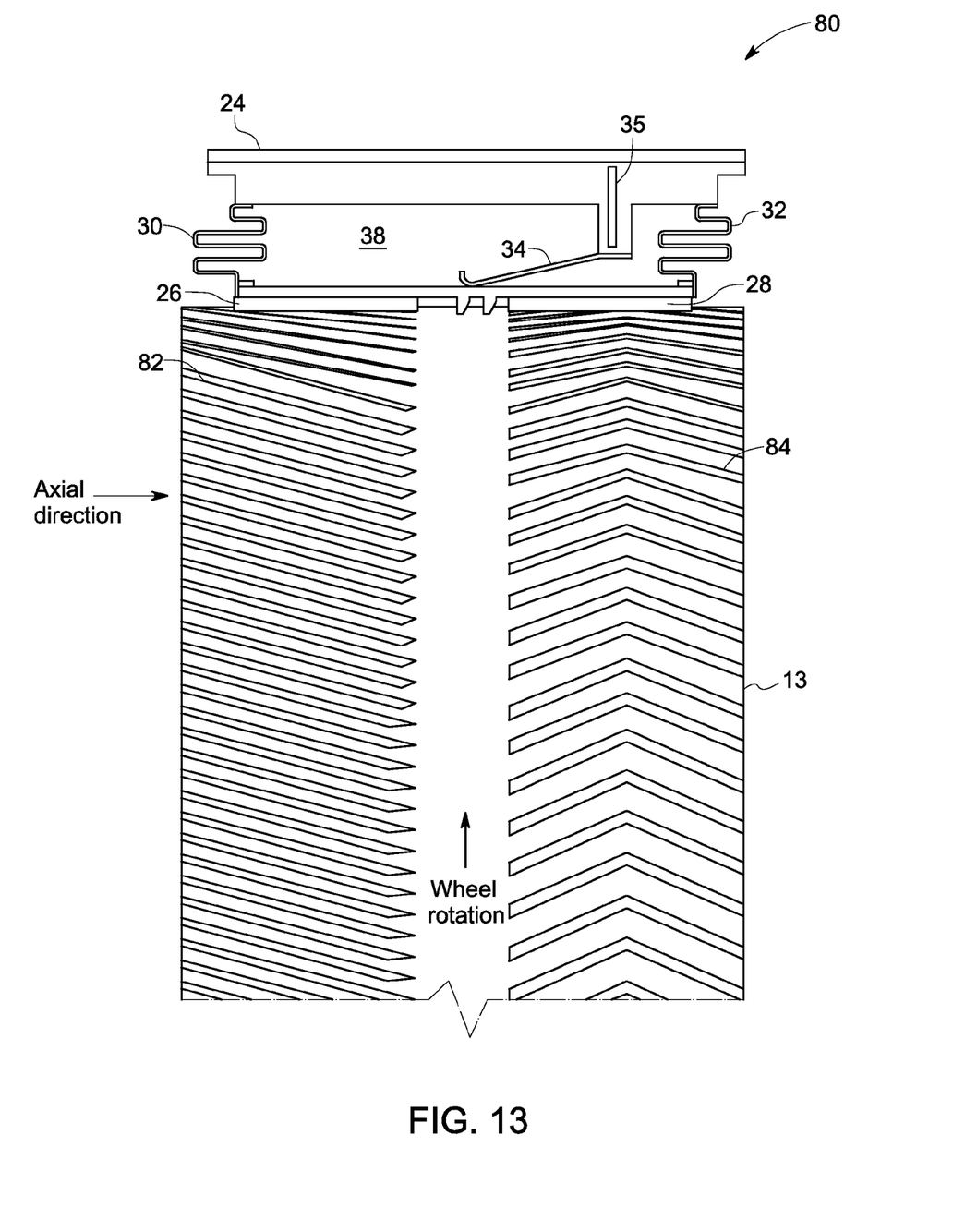
FIG. 13 shows rotor surface features of a rotor-stator seal assembly in accordance with an embodiment of the present invention.

FIG. 13 shows a rotor-stator seal assembly 80 in accordance with an embodiment of the present invention. In one embodiment, the rotor stator seal assembly 80 includes grooves or slots 82 on the rotor that are angled in an axial or tangential direction for generating aerodynamic forces during operation of the rotor machinery. In another embodiment, the rotor stator seal assembly 80 includes grooves or slots 84 on the rotor that are in a herringbone pattern for generating aerodynamic forces during operation of the rotor machinery.

Furthermore, in one embodiment, a portion of the rotor 13 beneath the forward shoe 26 includes grooves or slots or pockets 82 that are oriented in a combined axial and tangential direction. Further, in this embodiment, a portion of the rotor 13 beneath the aft shoe 28 includes a herringbone pattern. In yet another embodiment, the rotor 13 beneath each of the forward and aft shoes 26, 28 includes pocket/grooves/slots oriented in a purely axial or combined axial and tangential grooves or herringbone pattern. The grooves on the rotor 13 may be aligned in the direction of rotation or opposite to the direction of rotation.

Figure 14:
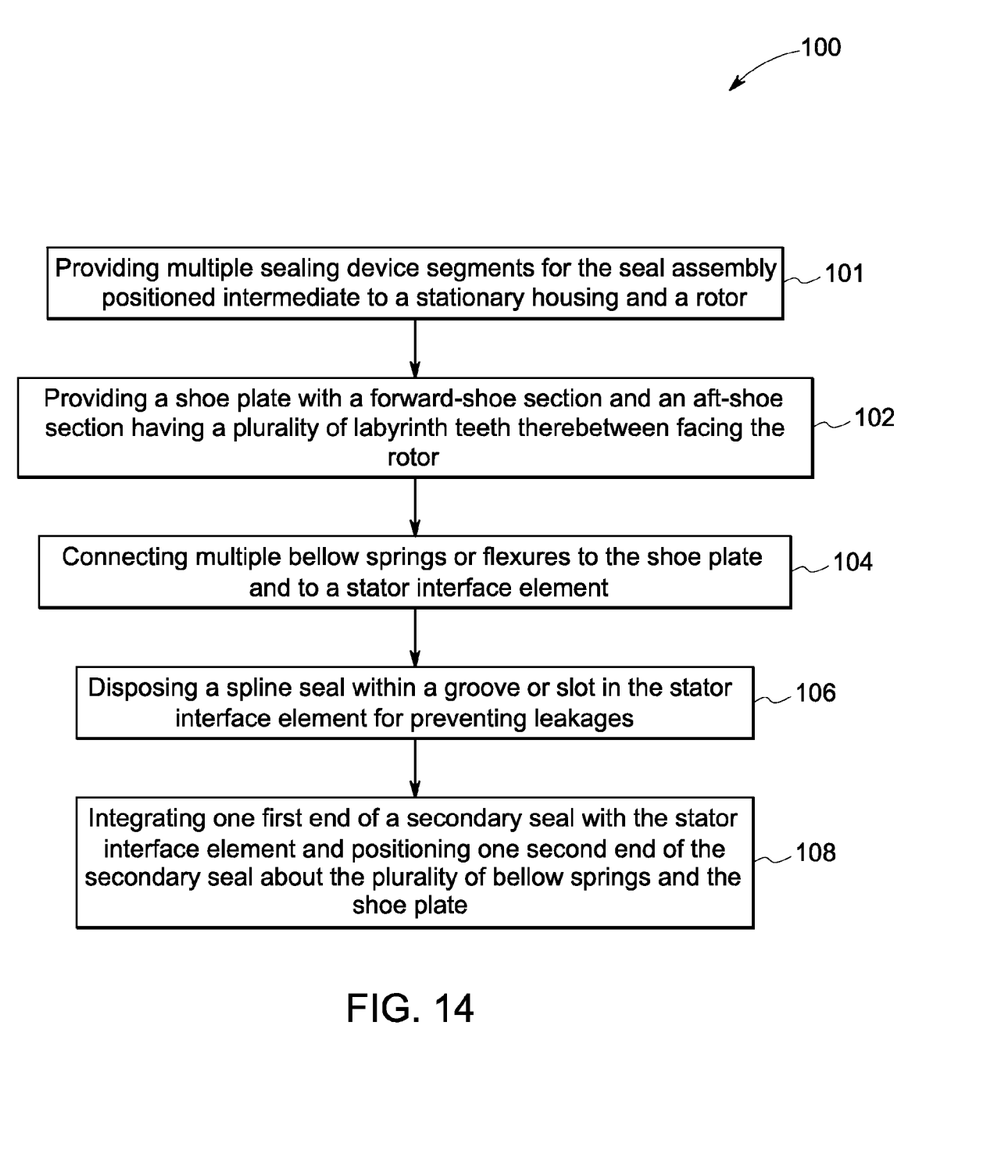
FIG. 14 is flow chart illustrating exemplary steps involved in method of forming a film riding seal between a stationary housing of a rotary machine and a rotatable element turning about an axis of the rotary machine in accordance with an embodiment of the present invention.

FIG. 14 is flow chart 100 illustrating steps involved in method of manufacturing a seal assembly is provided. The method includes providing a plurality of sealing device segments for the seal assembly positioned intermediate to a stationary housing and a rotor is provided at step 101. At step 102, the method includes providing a shoe plate with a forward-shoe section and an aft-shoe section having one or more labyrinth teeth therebetween facing the rotor. At step 104, the method includes connecting multiple bellow springs or flexures to the shoe plate and to a stator interface element. The method includes fastening or brazing the multiple bellow springs or flexures to the stator interface element and the shoe plate. Further at step 106, the method includes disposing spline seals within a groove or slot in the stator interface element for preventing leakages. At step 108, the method also includes integrating one end of a secondary seal with the stator interface element; and positioning the second end of the secondary seal about the plurality of bellow springs and the shoe plate. In one embodiment, the method further includes fastening or brazing the secondary seal to the stator interface element. In another embodiment, the method also includes coating a radially innermost surface of the shoe plate with a lubricating coating chosen from a group of metal-oxide based coatings that includes Plasma Spray (PS) developed by National Aeronautics and Space Administration (NASA) and known as NASA PS304 or NASA PS400. In yet another embodiment, the method also includes coating a radially innermost surface of the shoe plate with a lubricating coating chosen from a group of graphite, diamond-like carbon, and hexagonal boron nitride or similar other solid lubricant and wear resistant coatings. Furthermore, in another embodiment, the method includes coating a rotor surface interfacing the shoe plate with a material chosen from a group of chromium carbide, titanium aluminium nitride and the like.

Advantageously, the present aerodynamic seal assemblies are reliable, robust seal for several locations in rotating machinery with large pressure drops and large transients. The seal assemblies are also economical to fabricate. The non-contact operation of the seals makes them especially attractive for the large rotor transient locations. Further, the present invention allows independent controlling of the spring stiffness and the pressure resisting capability, thereby allowing the design of compliant seals that still withstands high pressure drops. Furthermore, the present invention allows for a shoe plate to remain parallel to the rotor in aerostatic operation and translate parallel to the rotor during the aerodynamic mode. The present invention also includes improved predictability for the radial motion (increased predictability for leakage performance and robustness).

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seal assembly for a rotary machine, the seal assembly comprising:
  a plurality of sealing device segments disposed circumferentially intermediate to a stationary housing and a rotor, wherein each of the segments comprises:
    a shoe plate with a forward-shoe section and an aft-shoe section having one or more labyrinth teeth therebetween facing the rotor, wherein the shoe plate is configured to allow a high pressure fluid to a front portion of the one or more labyrinth teeth and a low pressure fluid behind the one or more labyrinth teeth and further configured to generate an aerodynamic force between the shoe plate and the rotor,
    a stator interface element comprising a groove or slot for allowing disposal of a spline seal for reducing leakages;
    a plurality of bellow springs or flexures connected to the shoe plate and to the stator interface element; wherein the plurality of bellow springs or flexures are configured to allow the high pressure fluid to occupy a forward cavity and the low pressure fluid to occupy an aft cavity; and
    a secondary seal integrated with the stator interface element at one end and positioned about the plurality of bellow springs and the shoe plate at the other end.

2. The seal assembly of claim 1, further comprising a plurality of shiplap shims located within the seal assembly and configured to overlap adjacent secondary seals in the seal assembly.

3. The seal assembly of claim 2, wherein each of the shiplap shims comprises a first shim and a second shim angularly attached to each other.

4. The seal assembly of claim 3, wherein for each of the shiplap shims, the first shim is attached to one of the secondary seal and the second shim is configured to freely slide on the adjacent secondary seal of the seal assembly.

5. The seal assembly of claim 1, wherein the shoe plate is configured to generate the aerodynamic force due to radius of the shoe plate facing the rotor being larger than the radius of the rotor or due to presence of one or more Rayleigh steps on the shoe plate facing the rotor or due to the presence of grooves or slots angled in axial or tangential direction or in a herringbone pattern on the rotor.

6. The seal assembly of claim 1, wherein the secondary seal is curved in a circumferential direction.

7. The seal assembly of claim 1, wherein the secondary seal are curved in a circumferential direction.

8. The seal assembly of claim 1, wherein the one end of the secondary seal comprises an angled end attached in a slot located in the stator interface element.

9. The seal assembly of claim 8, wherein the secondary seal is integrated with the stator interface element via a supporting structure element.

10. The seal assembly of claim 9, wherein the supporting structure element is an extension of the stator interface element.

11. The seal assembly of claim 10, wherein the supporting structure element comprises a groove or slot for allowing disposal of a spline seal for reducing segment leakages.

12. The seal assembly of claim 10, wherein the secondary seal is interfaced with the supporting structure element for allowing radially outward movement of the secondary seal.

13. The seal assembly of claim 10, wherein the secondary seal is interfaced with the supporting structure element for preventing radially inward movement of the secondary seal.

14. The seal assembly of claim 1, wherein the plurality of bellow springs or flexures comprises of holes for relieving pressure.

15. A rotary machine, comprising:
  a rotor;
  a stator housing; and
  a plurality of sealing device segments disposed circumferentially intermediate to the stationary housing and the rotor, wherein each of the segments comprises:
    a shoe plate with a forward-shoe section and an aft-shoe section having one or more labyrinth teeth therebetween facing the rotor, wherein the shoe plate is configured to allow a high pressure fluid to a front portion of the one or more labyrinth teeth and a low pressure fluid behind the one or more labyrinth teeth and further configured to generate an aerodynamic force between the shoe plate and the rotor,
    a stator interface element comprising a groove or slot for allowing disposal of a spline seal for preventing leakages;
    a plurality of bellow springs or flexures connected to the shoe plate and to the stator interface element; wherein the plurality of bellow springs or flexures are configured to allow the high pressure fluid to occupy a forward cavity and the low pressure fluid to occupy an aft cavity; and
    a secondary seal integrated with the stator interface element at one end and positioned about the plurality of bellow springs and the shoe plate at the other end.

16. The rotary machine of claim 15, further comprising a forward shoe feeding groove and an aft shoe feeding groove at sides of the shoe plate towards a high pressure side and a low pressure side of the rotary machine respectively.

17. The rotary machine of claim 15; wherein the secondary seal is attached to the stator interface element.

18. The rotary machine of claim 15, wherein the one end of the secondary seal comprises an angled end attached in a slot located in the stator interface element.

19. The rotary machine of claim 15, wherein the secondary seal is integrated with the stator interface element via a supporting structure element for allowing radially outward movement of the secondary seal and preventing radially inward movement of the secondary sea.

20. The rotary machine of claim 19, wherein the supporting structure element comprises a groove or slot for allowing disposal of a spline seal for preventing leakages.

* * * * *